(12) United States Patent
Wright

(10) Patent No.: US 6,511,132 B1
(45) Date of Patent: Jan. 28, 2003

(54) DOUBLE SHOULDERED JAM NUT FOR ATTACHING A WHEEL LINER TO DIFFERENT WHEELS AND METHODS OF USE THEREOF

(75) Inventor: James P. Wright, Cookeville, TN (US)

(73) Assignee: Phoenix USA, Inc., Cookeville, TN (US)

(*) Notice: Subject to any disclaimer, the term of this patent is extended or adjusted under 35 U.S.C. 154(b) by 0 days.

(21) Appl. No.: 09/760,112

(22) Filed: Jan. 12, 2001

(51) Int. Cl.[7] .................................................. B60B 7/14
(52) U.S. Cl. ............................. 301/37.371; 301/37.374
(58) Field of Search ....................... 301/37.102, 37.371, 301/37.372, 37.374, 37.375, 37.376; 411/427, 429

(56) References Cited

U.S. PATENT DOCUMENTS

| | | | |
|---|---|---|---|
| 2,556,672 A | * | 6/1951 | Bergh et al. |
| 3,960,047 A | * | 6/1976 | Liffick |
| 4,729,606 A | | 3/1988 | Narita et al. |
| 4,895,415 A | | 1/1990 | Stay et al. |
| 4,932,724 A | | 6/1990 | Wright |
| 5,096,263 A | | 3/1992 | Wright |
| 5,181,767 A | | 1/1993 | Hudgins et al. |
| 5,193,884 A | | 3/1993 | Sheu et al. |
| 5,205,614 A | | 4/1993 | Wright |
| 5,205,616 A | | 4/1993 | Wright |
| 5,222,785 A | * | 6/1993 | Green |
| 5,277,478 A | | 1/1994 | Wright |
| 5,286,093 A | | 2/1994 | Wright |
| 5,380,070 A | | 1/1995 | FitzGerald |
| 5,443,582 A | | 8/1995 | Ching |
| 5,503,465 A | * | 4/1996 | Price et al. |
| 5,645,324 A | | 7/1997 | Wright et al. |
| 5,667,281 A | | 9/1997 | Ladouceur |
| 5,669,672 A | | 9/1997 | Wright et al. |
| 5,676,430 A | | 10/1997 | Wright et al. |
| 5,695,257 A | | 12/1997 | Wright et al. |
| 5,722,735 A | | 3/1998 | Wright et al. |
| 5,890,773 A | | 4/1999 | Wright et al. |
| 6,070,947 A | * | 6/2000 | Hoyle, Jr. |

* cited by examiner

Primary Examiner—Russell D. Stormer
(74) Attorney, Agent, or Firm—Waddey & Patterson, P.C.; Edward D. Landquist, Jr.; Douglas W. Schelling

(57) ABSTRACT

The present invention discloses a jam nut, method and system used for attaching wheel liners to vehicle wheels. Each wheel liner attaches to a vehicle wheel when the wheel liner is aligned between the exposed lug bolts of the vehicle wheel and jam nuts that attach to the lug bolts. The wheel liner defines openings that are sized to receive the cylindrical extension members located on the ends of the jam nut without receiving the hexagonal portion of the jam nut.

12 Claims, 9 Drawing Sheets

DOUBLE SHOULDERED JAM NUT FOR ATTACHING A WHEEL LINER TO DIFFERENT WHEELS AND METHODS OF USE THEREOF

FIELD OF THE INVENTION

The present invention relates generally to the apparatus, methods and systems for attaching wheel liners to vehicle wheels. More specifically, the invention relates to apparatus, methods and systems for attaching said wheel liners to lug bolts of a vehicle wheel by frictional engagement.

BACKGROUND OF THE INVENTION

Many truck owners desire to have wheel liners to cover the load-bearing structure of vehicle wheels. The primary function is to enhance the appearance of the vehicle wheels. Wheel liners are preferred since they allow the use of material that is aesthetically pleasing that may not be satisfactory for performing the load-bearing function of a vehicle wheel.

To this end, there have been many proposals of systems for attaching wheel liners to vehicle wheels. Several of the systems include attaching the wheel liner beneath lug nuts, using mounting brackets beneath lug nuts, or providing attachment to the vehicle wheel by using clips. What is needed is an attachment apparatus and attachment system that relies upon the threaded extension of a lug bolt for attachment.

It would be appreciated by those skilled in the art that many sizes of wheels and lengths of lug bolts are commonly used by various manufacturers. Historically, it has been necessary to specialize wheel liner apparatus in mounting systems for specific wheel sizes and styles. The consequence of such necessity has been the requirement of large inventories of individual parts, as well as the increased complexity of shopping for and installing wheel liners due to the many details required to ensure proper purchase and installation. Further, shipping of these wheel cover systems has been difficult given the need for specialized parts.

What is needed, then, is an apparatus, method and system for attaching a wheel liner to a variety of sizes or shapes of vehicle wheels. Such apparatus and method must allow easy attachment and quick installation. Such apparatus and method must allow attachment to the wheel without removing the lug nuts.

SUMMARY OF THE INVENTION

The present invention discloses a jam nut that attaches to a lug bolt in order to attach a wheel liner to a vehicle wheel. The present invention also discloses a method and kit used for the attachment of a wheel liner to a vehicle wheel. The wheel liner is placed between the exposed tip of a lug bolt and a jam nut so that the cylindrical extension member of the jam nut is received through a properly aligned hole in the wheel liner. The jam nut is then turned to frictionally engage the exposed portion of the lug bolt. Since the diameter of the hole in the wheel liner is smaller than the maximum diameter between parallel faces of the jam nut, the wheel liner is attached to the vehicle wheel due to the frictional engagement of the jam nut to the lug bolt. The wheel liner kit employs this method of attaching the wheel liner to vehicle wheels.

Accordingly, one object of the present invention is to provide a jam nut used for attachment of a wheel liner to numerous sizes and styles of vehicle wheels.

Another object of the present invention is to provide a method and system of wheel liner attachment that will result in the easy installation of a wheel liner as well as easy removal from the vehicle wheel.

Another object of the present invention is to provide a jam nut, having only one axial extension, used for attachment of a wheel liner to numerous sizes and styles of vehicle wheels.

Another object of the present invention is to provide an apparatus, method and kit that takes advantage of the exposed portion of a lug bolt.

Another object of the present invention is to provide an apparatus, method and kit for securely attaching a wheel liner to a vehicle wheel.

Still another object of the present invention is to enhance the aesthetic value of vehicle wheels.

DESCRIPTION OF THE PREFERRED EMBODIMENTS

Figure 1:
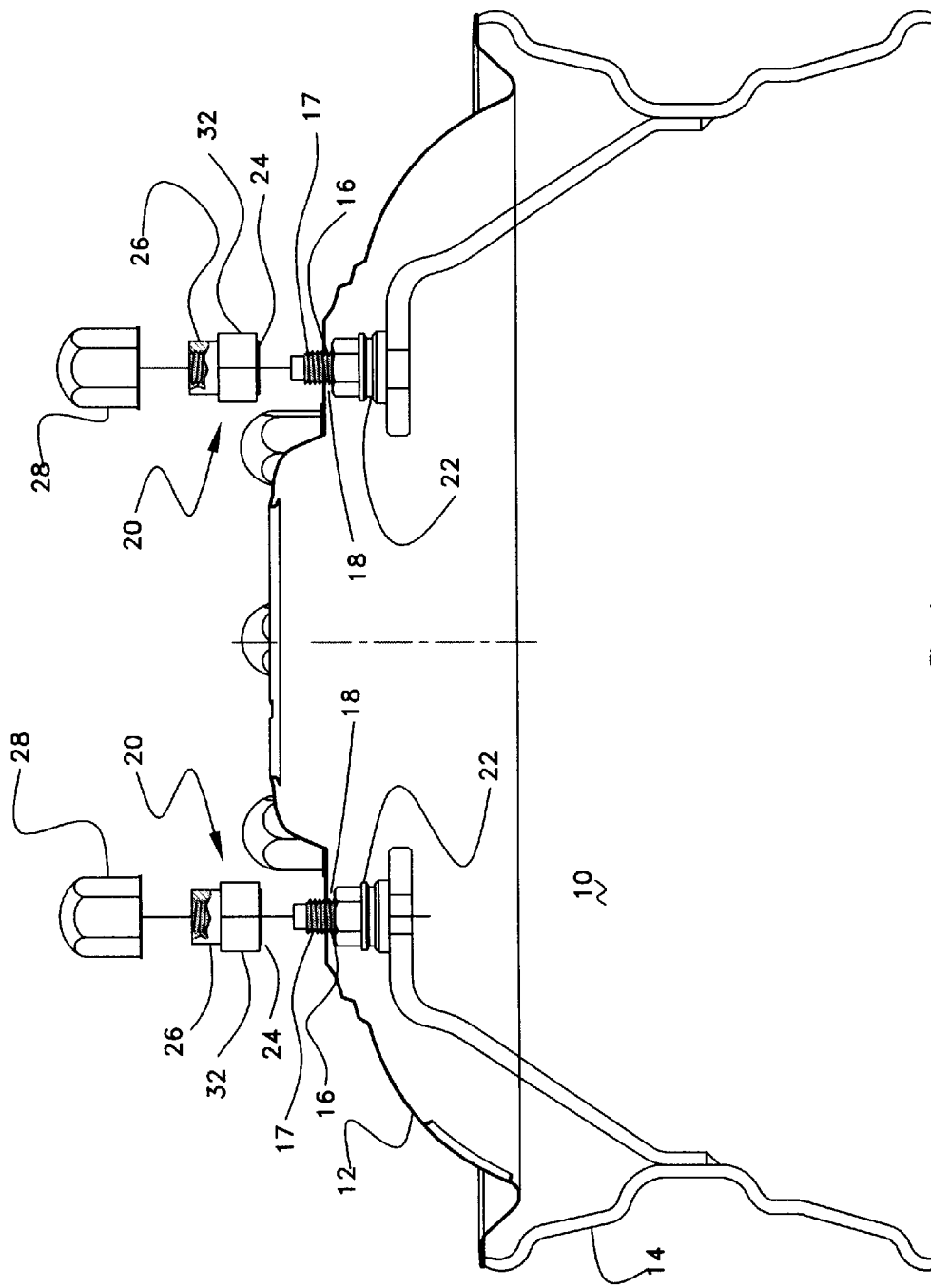
FIG. 1 is cross section view of the wheel liner attachment system of the present invention.

Referring now to FIGS. 1–4, there is shown a wheel liner attachment system 10. In the preferred embodiment, specifically shown in FIGS. 1–2, wheel liner 12 is held adjacent to the wheel 14 so that the extended portion 17 of the lug bolt 16 is received through the opening of the wheel liner 18. The wheel liner 12 attaches to the wheel 14 when the jam nut 20 is tightened and frictionally engages the lug bolt 16. Alternatively, wheel liner 12 is held adjacent to the wheel 14 when the second axial extension 26 of the jam nut 20 is received through the opening of the wheel liner 18 and frictionally engages the lug bolt 16. The second axial extension 26 is also described as the second straight cylindrical extension member. Wheel 14 has conventional lug bolts 16 that are received by conventional lug nuts 22. The size of the opening of the wheel liner 18 is smaller than the maximum diameter between parallel faces of the jam nut body 32 and sufficient in size to pass therethrough either the first axial extension 24 or the second axial extension 26. In certain embodiments, the jam nut body 32 has a hexagonal shape so that the jam nut may be tightened by a wrench or by hand. The first axial extension 24 is also described as the first straight cylindrical extension member. Also, the second axial extension 26 is also described as the second straight cylindrical extension member.

Figure 6:
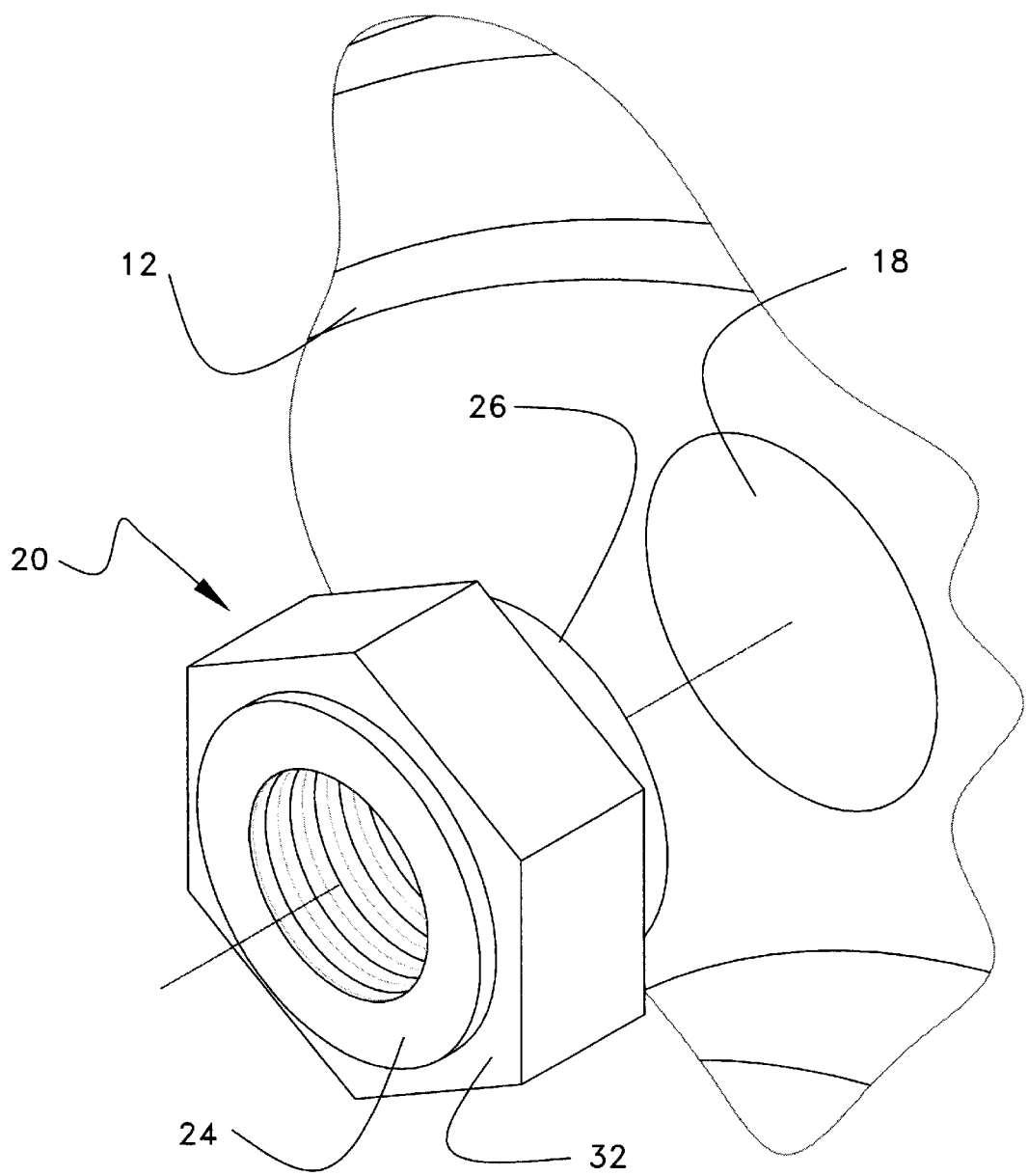
FIG. 6 is an isometric view of the jam nut showing the length of the short cylindrical extension member.
Figure 7:
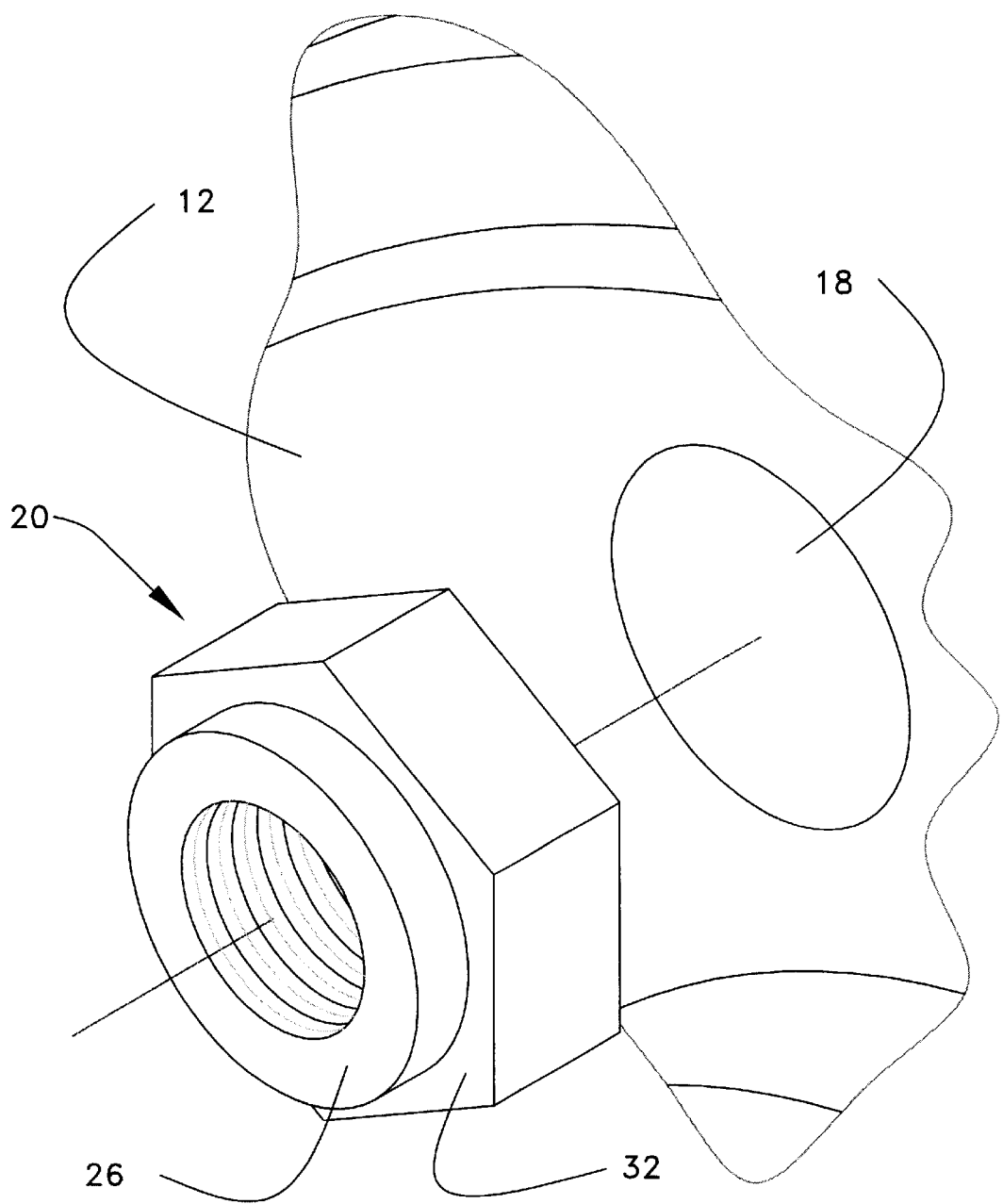
FIG. 7 is an isometric view of the jam nut showing the length of the long cylindrical extension member.

Referring now to FIGS. 6 and 7, there is shown generally a jam nut 20. The jam nut 20 has a first axial extension 24 that is a different length than the second axial extension 26. The first axial extension 24, also described as the first straight cylindrical extension member, has a length of 2 mm. The second axial extension 26, also described as the second cylindrical extension member, has a length of 6 mm. Each jam nut has a threaded bore, defined by the first axial extension 24, the jam nut body 32, and the second axial extension 26, that extends the length of the jam nut 20. The first axial extension 24 and the second axial extension 26 have the same diameter and cross-sectional shape. Such diameter is less than the maximum diameter between parallel faces of the jam nut 20.

Figure 8:
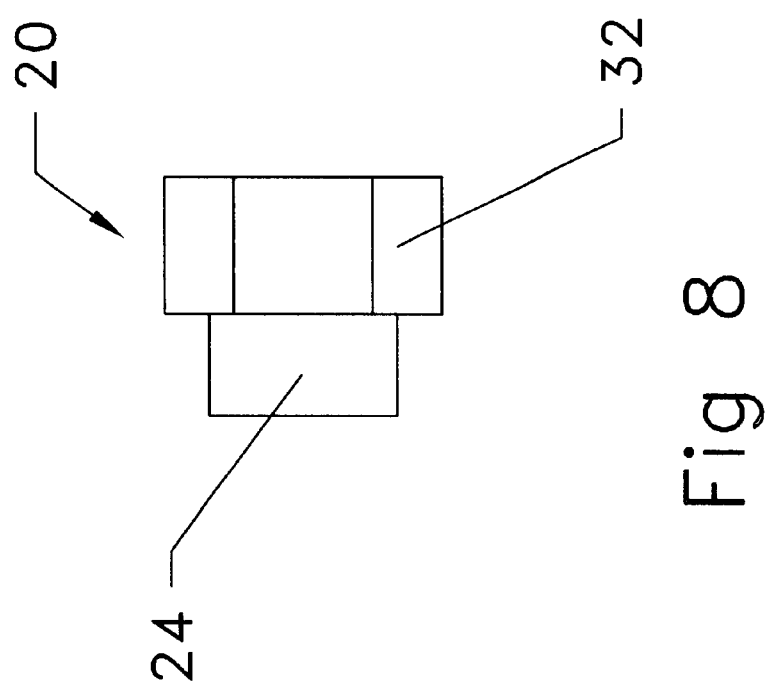
FIG. 8 is an elevated side view of the jam nut showing the single extension.

Referring now to FIG. 8, there is shown a jam nut 20. The jam nut 20 has a first axial extension 24. The jam nut body 32 and the first axial extension 24 define a threaded bore that extends the length of the jam nut 20.

Figure 5:
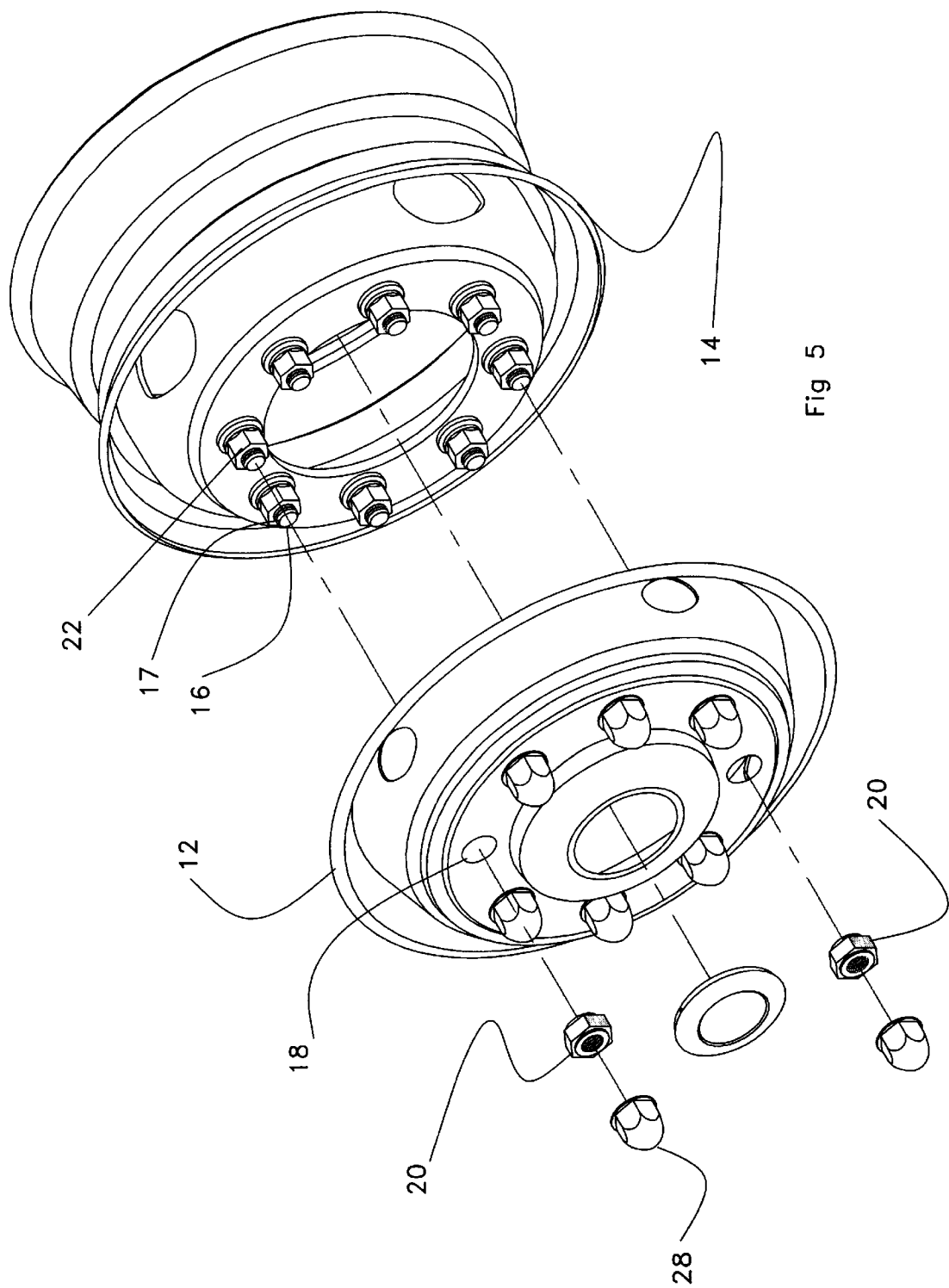
FIG. 5 is an exploded view of the wheel liner attachment system of the present invention.

Referring now to FIG. 5, during installation the wheel liner 12 is placed between the lug bolt 16 and the jam nut 20. The jam nut 20 is threaded onto the extended portion 17 of the lug bolt 16. The function of both the first axial extension 24 and the second axial extension 26 is to provide spacing between the surface of the lug nut 22 and the hexagonal portion of the jam nut 20 so that wheel liner 12 is attached to the wheel 14 without distorting the shape of the wheel liner 12.

Figure 2:
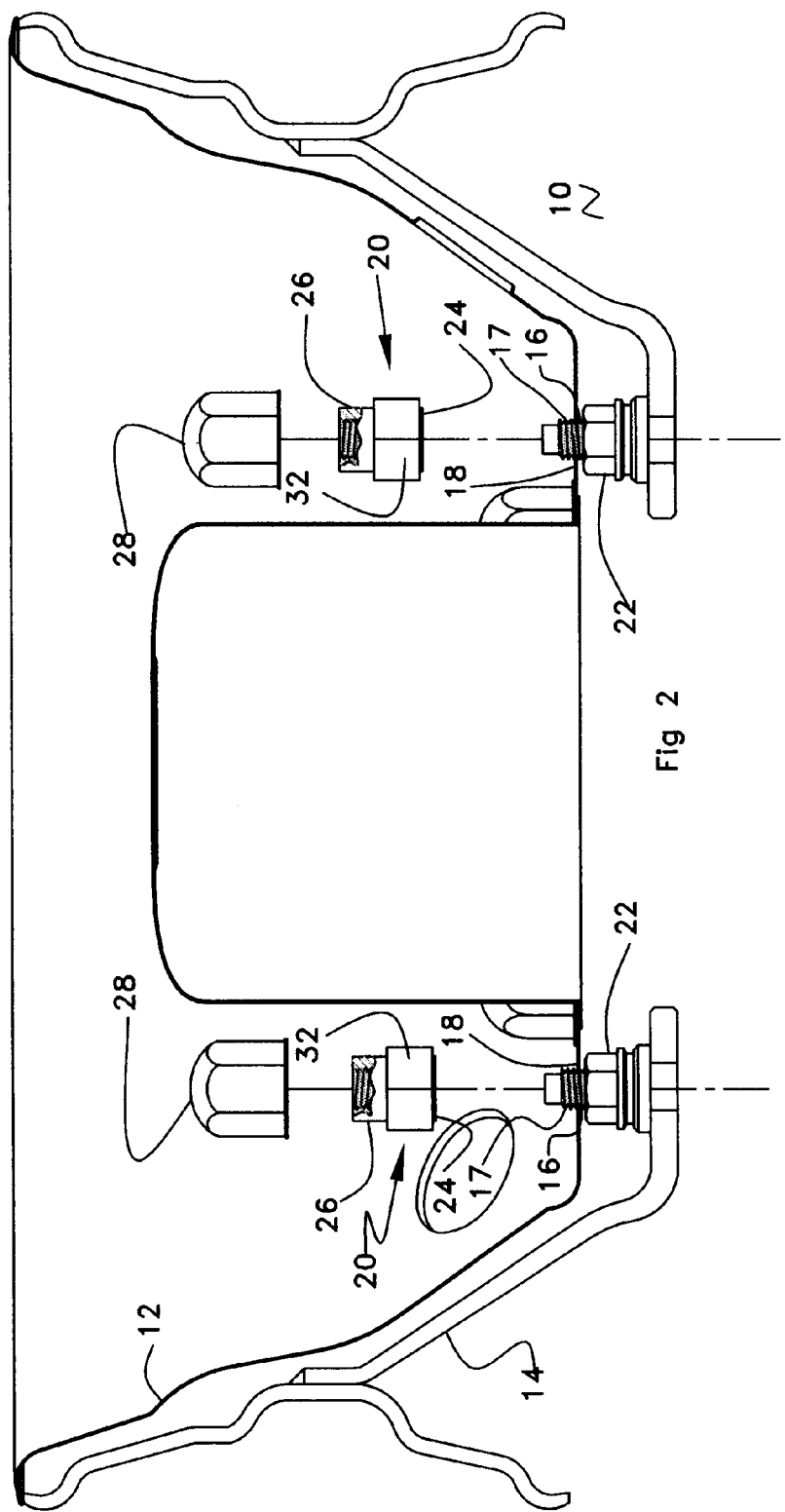
FIG. 2 is a cross section view of the wheel liner attachment system of the present invention showing an alternate wheel.

Usage of either the first axial extension 24 or the second axial extension 26, which differ in length, is determined by the distance from the wheel liner 12 to the surface of the lug nut 22. The purpose of providing both the first axial extension 24 and the second axial extension 26 on a jam nut 20 is to provide a single jam nut that has dual function. The dual utility of the jam nut 20 is demonstrated by comparing FIG. 1 with FIG. 3 and FIG. 2 with FIG. 4. In FIGS. 1 and 2 the wheel liner 12 is within close proximity to the surface of lug nut 22 so that the shorter cylindrical extension of the first axial extension 24 is satisfactory in length to allow attachment of the wheel liner 12 to the wheel 14 without distorting the shape of the wheel liner 12. Once the jam nut 20 is tightened onto the lug bolt 16, the first axial extension 24 is contacting the surface of the lug nut 22 and the jam nut body 32 is holding the wheel liner 12 against the wheel 14 so that the shape of the wheel liner 12 is not distorted.

Figure 3:
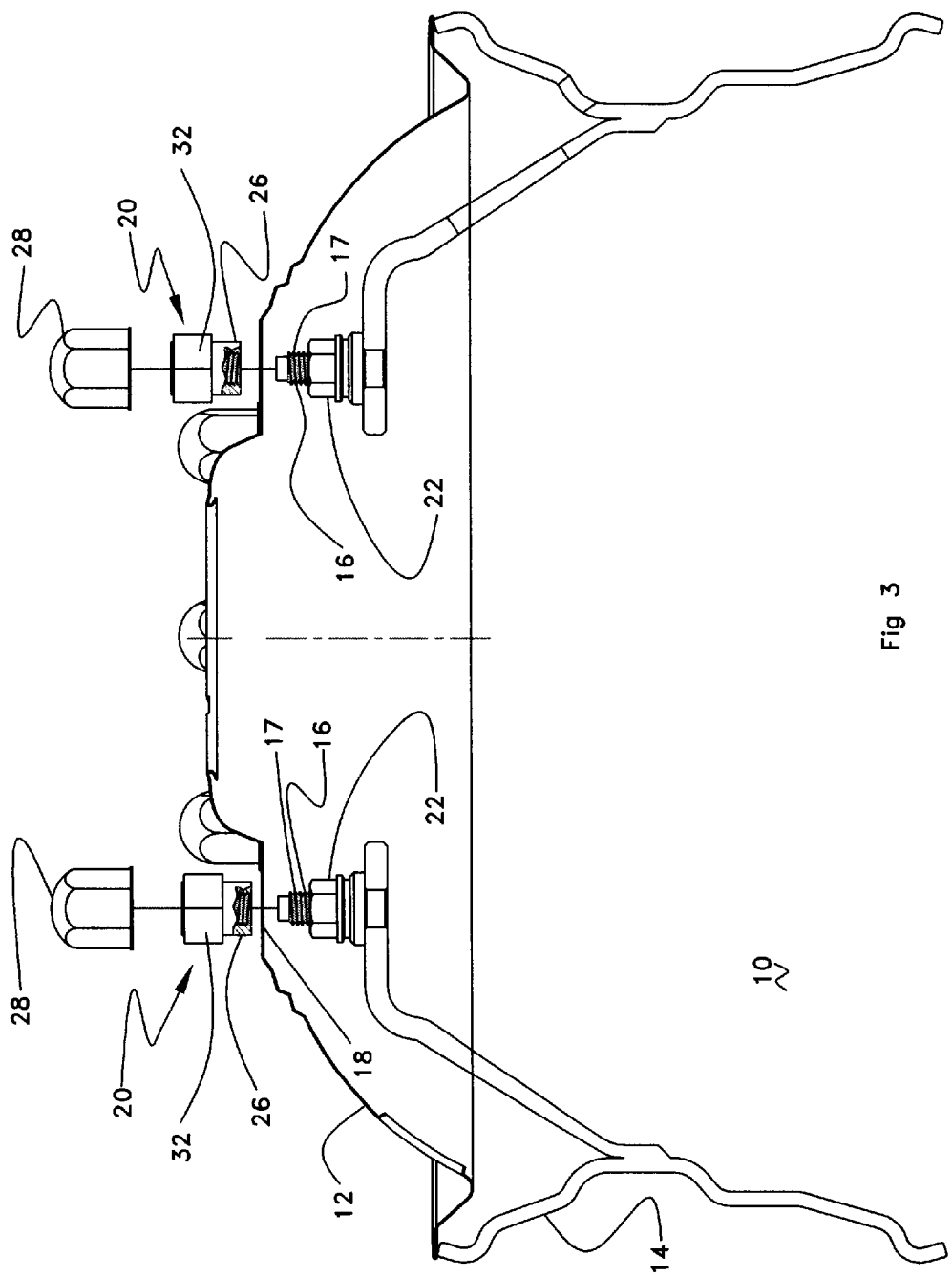
FIG. 3 is a cross section view of the wheel liner attachment system of the present invention showing an alternate use of the jam nut.
Figure 4:
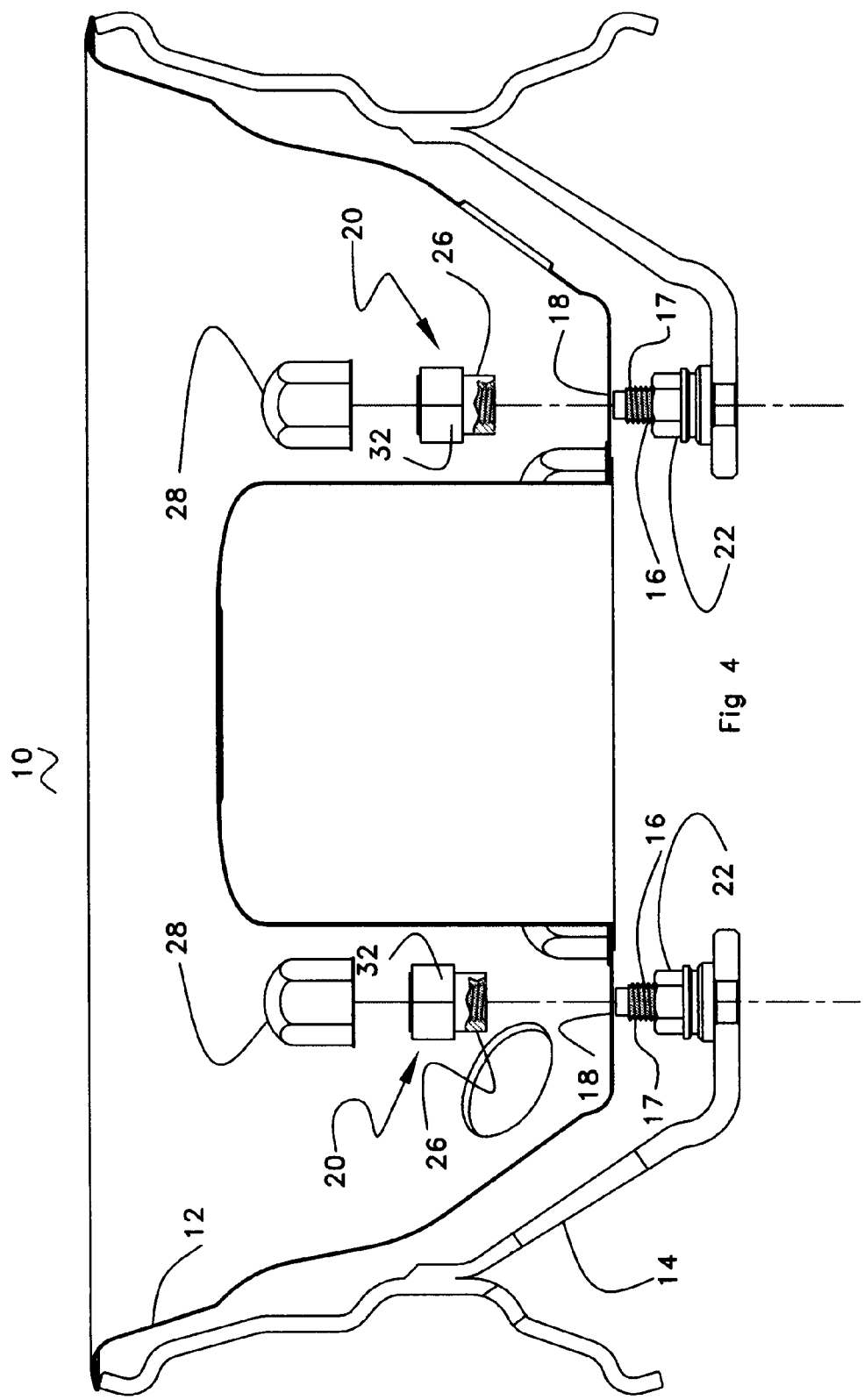
FIG. 4 is a cross section view of the wheel liner attachment system of the present invention showing an alternate use of the jam nut in combination with an alternate wheel

FIGS. 3 and 4 show the placement of wheel liner 12 adjacent to wheel 14 such that the extended portion 17 of the lug bolt 16 is not received through the opening of the wheel liner 18. The second axial extension 26 is sufficient in length to be received through the opening of the wheel liner 18 and reach the lug bolt 16 so that the jam nut 20 frictionally engages the extended portion 17 of the lug bolt 16. Tightening the jam nut 20 onto the extended portion 17 of the lug bolt 16 so that the second axial extension 26 contacts the surface of the lug nut 22 allows the wheel liner 12 to be held against the wheel 14 by the jam nut body 32 without distorting the shape of the wheel liner 12.

An advantage of the present invention is that it allows the attachment of wheel liners without distorting the shape of the wheel liners. In many currently existing attachment systems, wheel liners are subject to a clamping or squeezing distortion. Such pinching distortion will result in the stress, cracking or change in appearance of the portion of the wheel liner immediately adjacent to the point of attachment. The function of both the first axial extension 24 and the second axial extension 26 is to provide spacing so that the wheel liner 12 is not subject to a clamping, squeezing or pinching distortion. When the jam nut 20 is tightened to contact the surface of the lug nut 22, in either orientation, the jam nut body 32, often hexagonally shaped, holds the wheel liner 12 adjacent to the wheel 14 so that the wheel liner 12 is held in a position without contacting the surface of the lug nut 22. More specifically, the jam nut body 32 holds the wheel liner 12 against the wheel 14 by producing a single sided pressure that is not sufficient to distort the wheel liner 12 in a capacity that results in the damage which occurs when clamping distortion is applied. Thus, either the first axial extension 24 or the second axial extension 26 can fill the different amount of space located between the wheel liner 12 and the surface of the lug nut 22.

Referring now to FIGS. 6 and 7, there is shown the size of the opening of the wheel liner 18. The size of the opening of the wheel liner 18 is smaller than the maximum diameter between parallel faces of the jam nut body 32. However, the diameter of the opening of the wheel liner 18 is greater than the diameter of either the first axial extension 24 or the second axial extension 26, which are identical.

Figure 9:
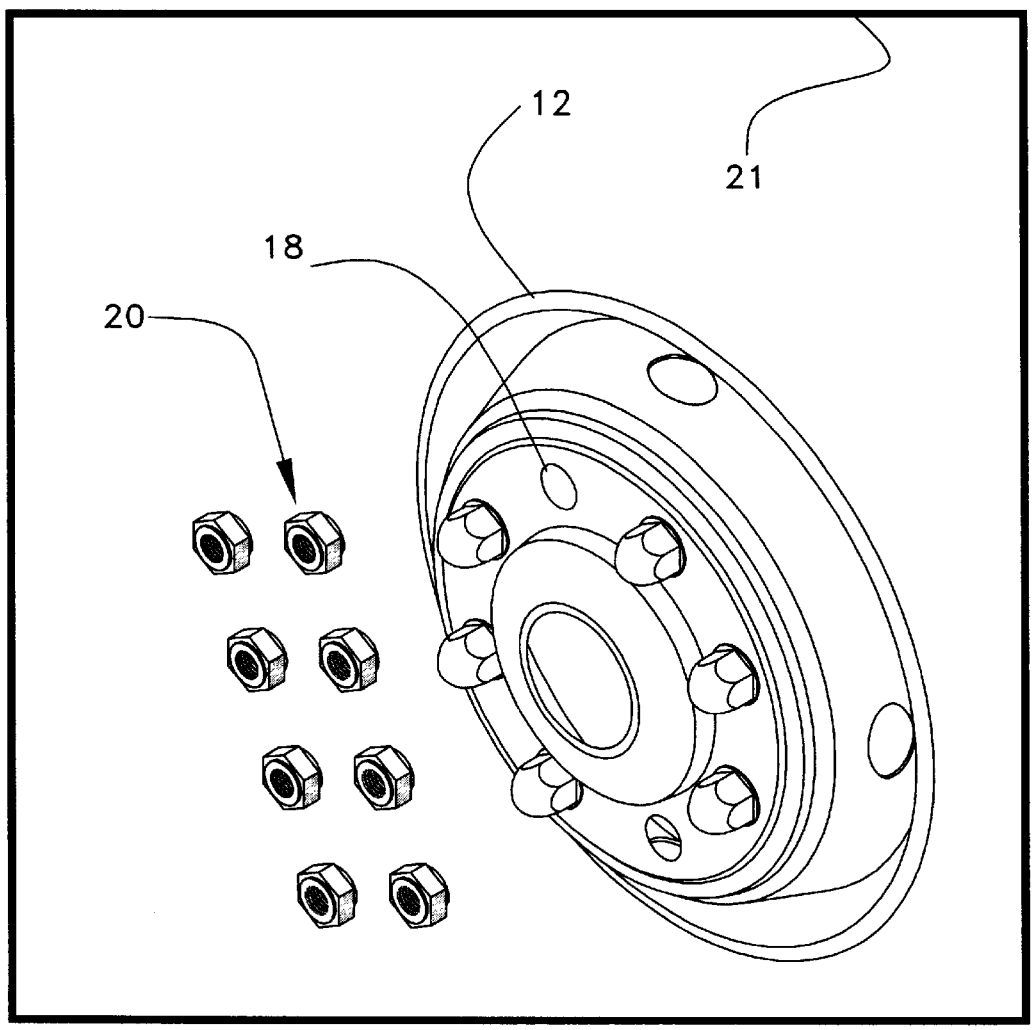
FIG. 9 is a top view of the kit for attaching a wheel liner to a vehicle wheel mounted by a plurality of lug bolts extending through and beyond a plurality of lug nuts.

A kit for attaching a wheel liner 12 to a vehicle wheel 14 is disclosed by the present invention. A kit may contain either the essential elements or the essential elements plus an installation tool. Either kit contains the wheel liner 12 having a plurality of openings 18, a plurality of jam nuts 20 and a package 21, packaged together, as shown in FIG. 9. The openings 18 of the wheel liner 12 are also known as holes. The jam nuts 20 included in the kit are constructed to frictionally engage the lug bolt 16. Additionally, the jam nuts 20 that are included in the kit have either the first axial extension 24 and second axial extension 26 or only the first axial extension 24. In certain embodiments, the length of the first axial extension 24 is 2 mm and the length of the second axial extension 26 is 6 mm. The differing lengths of the axial extensions allow the jam nut 20 to be reversed so that either extension may fill the space located between the wheel liner and the surface of the lug nuts 22. The jam nuts 20 having only the first axial extension 24 are also reversible. Also, the wheel liner 12 that is included in the kit defines openings 18 that are sufficient in size to receive either the first axial extension 24 or the second axial extension 26. The opening of the wheel liner 18 is too small to receive the jam nut body 32.

A kit for attaching a wheel liner 12 to a vehicle wheel 14 may also contain elements other than those that are essential. For example, a kit that allows installation of the wheel liner 12 contains: two front wheel liners 12, two rear wheel liners 12, eight right-handed 20 mm jam nuts 20, eight right-handed 22 mm jam nuts 20, eight jam nut covers 28, two pop out center caps, four center hub logos, and one installation tool. Such a kit allows for simple installation that does not require the use of power tools.

Referring now to FIG. 5, there is shown the wheel liner assembly. The wheel 14 has a plurality of openings that receive the lug bolts 16. Each lug bolt 16 receives a lug nut 22 so that the wheel 14 attaches to a vehicle. The assembly includes a wheel liner 12 having a plurality of openings 18 that receive the extended portion 17 of the lug bolt 16. The lug bolt 16 receives a jam nut 20. The jam nut 20 has a threaded bore extending through the full length of the jam nut 20. The orientation of the jam nut 20 is determined by the distance between the opening of the wheel liner 18 and the surface of the lug nuts 22.

Once the jam nut 20 has been tightened down upon the surface of the lug nut 22, the jam nut covers 28 are placed on all jam nuts 20. The jam nut covers 28, as illustrated in FIGS. 1–5, are sufficient in size to cover the jam nut body 32 as well as either the first axial extension 24 or the second axial extension 26.

An example of the utility of the jam nut 20 is shown when such jam nut is used to attach a wheel liner 12 to either a 19.5"×6.00" wheel or a 19.5"×6.75" wheel. Both are commonly used on chassis manufactured by Ford Motor Company. When the jam nut 20 is used to attach a wheel liner 12 to a 19.5×6.75" wheel, the second axial extension 26, having a length of 12 mm, will contact the surface of the lug nut 22. Alternatively, when the jam nut 20 is used to attach a wheel liner 12 to a 19.5"×6.00" the first axial extension 24, having a length of 1 mm, will contact the surface of the lug nut 22 upon tightening of the jam nut 20 onto the lug bolt 16. The use of a single jam nut 20 to allow attachment of a wheel liner 12 to multiple wheels provides the benefit of reducing the inventory maintained by retailers.

Another example is when such a jam nut 20 is used to attach a wheel liner 12 to an Accuride wheel #28680. This wheel has only a single width but various manufacturers use different height lug nuts. When the jam nut 20 is used to attach a wheel liner 12 to an Accuride wheel #28680 with short lug nuts, the second axial extension 26 will contact the surface of the lug nut 22. Alternatively, when the jam nut 20 is used to attach a wheel liner 12 to an Accuride wheel #28680 with tall lug nuts, the first axial extension 24 will contact the surface of the lug nut 22 upon tightening of the jam nut 20 onto the lug bolt 16. Additionally, shopping for a wheel liner kit and installing the wheel liner is simplified since a single jam nut universally allows attachment to multiple wheels.

The jam nut 20 securely attaches the wheel liner 12 to the wheel 14 without the use of additional parts such as liners, spacers or stud extenders. Liners and spacers are used to avoid the pinching or squeezing deformation that occurs to the wheel liner 12 when it is sandwiched between the surface of the lug nut 22 and the surface of the hexagonal portion of the jam nut 20. The present invention avoids the use of such additional parts since the axial extensions of the jam nut 20 fit through the opening of the wheel liner 18 and thread onto the lug bolt 16. When the jam nut 20 is properly tightened, the bottom face of the axial extension rests on the top surface of the lug nut 22. Additionally, wheels with different axial depths commonly require the use of either stud extenders or other parts to fit the different depths. The jam nut 20 is a single item that may be used with multiple wheels of differing axial depths. The use of jam nuts will increase order accuracy and decrease inventory space required since fewer parts will be ordered by retailers.

The present invention allows attachment of wheel liners 12 to wheels 14 of multiple manufacturers that may use either short or long lug nuts. For example, the longer axial extension 26 may be used with short lug nuts and the shorter first axial extension 24 may be used on wheels providing longer lug nuts.

The axial extensions of the jam nut 20 that extend through the openings of the wheel liner 18 keep the wheel liner 12 centered on the wheel 14. Keeping the wheel liner 12 centered increases the aesthetic value of the wheel 14. The reception of the axial extensions by the openings 18 also contributes to steadily holding the wheel liner 12 to the wheel 14.

The present invention simplifies the method of attachment of a wheel liner 12 to a wheel 14. There is no need to remove original equipment such as lug nuts 22. Installation of the wheel liner 12 is completed by threading jam nuts 20 onto the exposed lug bolts 16 and covering the jam nut with jam nut covers 28. The tool included in the installation kit may be used to tighten the jam nuts 20 so that no additional tools are required. Installation of the jam nut covers 28 is completed by manually pushing the covers over the jam nuts 20. The final step of the installation is to apply the hub center emblem.

Thus, although there have been described particular embodiments of the present invention of a new and useful apparatus, method and system for attaching a wheel liner to a wheel, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What is claimed is:

1. A jam nut for attaching a wheel liner to a vehicle wheel, comprising:

a jam nut body;

a first axial extension extending from the jam nut body; and a second axial extension extending from the jam nut body, wherein the jam nut body, the first axial extension, and the second axial extension define a threaded bore therethrough, wherein the first and second axial extensions are of different lengths so that the jam nut can be reversed for either the first axial extension or the second axial extension to fill a different amount of space located between the wheel liner and the vehicle wheel.

2. The jam nut of claim 1, wherein the first axial extension has a length of 2 mm and the second axial extension has a length of 6 mm.

3. The jam nut of claim 1, wherein the first axial extension has a length of 1 mm and the second axial extension has a length of 12 mm.

4. A method of attaching a plurality of types of wheel liners to a plurality of types of vehicle wheels mounted by a lug bolt extending through and beyond a lug nut using a jam nut having a first straight cylindrical extension member, comprising the steps of:

(a) providing the wheel liner defining a hole sufficient in size to pass therethrough the first straight cylindrical extension member of the jam nut;

(b) placing the wheel liner adjacent to the vehicle wheel so that the hole of the wheel liner aligns with the lug bolt of the vehicle wheel; and (c) holding the wheel liner against the vehicle wheel by frictionally engaging the jam nut to the lug bolt through the hole so that the first straight cylindrical extension member contacts the lug nut and the wheel liner is spaced from the lug nut without distorting the wheel liner.

5. A method of attaching a plurality of types of wheel liners to a plurality of types of vehicle wheels mounted by a lug bolt extending through and beyond a lug nut using a jam nut having a first straight cylindrical extension member and a second straight cylindrical extension member, comprising the steps of:

(a) providing the wheel liner defining a hole sufficient in size to pass therethrough either the first straight cylindrical extension member or the second straight cylindrical extension member of the jam nut;

(b) placing the wheel liner adjacent to the vehicle wheel so that the hole of the wheel liner aligns with the lug bolt of the vehicle wheel; and (c) holding the wheel liner against the vehicle wheel by frictionally engaging the jam nut to the lug bolt through the hole so that either the first straight cylindrical extension member or the second straight cylindrical extension member contacts the lug nut and the wheel liner is spaced from the lug nut without distorting the wheel liner.

6. A kit for attaching a wheel liner to a vehicle wheel mounted by a plurality of lug bolts extending through and beyond a plurality of lug nuts, comprising:

the wheel liner defining a plurality of holes;

a plurality of jam nuts having a jam nut body, a first axial extension extending from the jam nut body, and a second axial extension extending from the jam nut body, wherein the jam nut body, the first axial extension, and the second axial extension define a threaded bore therethrough; and a package containing the wheel liner and the plurality of jam nuts, wherein each hole defined by the wheel liner is sufficient in size to pass therethrough the second axial extension of the jam nut.

7. A kit for attaching a wheel liner to a vehicle wheel mounted by a plurality of lug bolts extending through and beyond a plurality of lug nuts, comprising:

the wheel liner defining a plurality of holes;

a plurality of jam nuts having a jam nut body, a first axial extension extending from the jam nut body, and a second axial extension extending from the jam nut body, wherein the jam nut body, the first axial extension, and the second axial extension define a threaded bore therethrough; and a package containing the wheel liner and the plurality of jam nuts, wherein the first and second axial extensions are of different lengths so that the jam nut can be reversed for either the first axial extension or the second axial extension to fill a different amount of space located between the wheel liner and the vehicle wheel.

8. A wheel liner assembly, comprising:

a vehicle wheel having a plurality of openings;

a plurality of lug bolts, each lug bolt received by a corresponding one of the plurality of openings of the vehicle wheel and having an end portion;

a plurality of lug nuts, each lug nut engaging a corresponding one of the plurality of lug bolts so that the vehicle wheel attaches to a vehicle and the end portion of the plurality of lug bolts extends through and beyond the plurality of lug nuts;

a wheel liner having a plurality of holes, each hole receiving a corresponding one of the end portions of the plurality of lug bolts;

a plurality of jam nuts, each jam nut engaging a corresponding one of the end portions of the plurality of lug bolts, each jam nut having a jam nut body, a first axial extension extending from the jam nut body, and a second axial extension extending from the jam nut body, wherein the jam nut body, the first axial extension, and the second axial extension define a threaded bore therethrough; and a plurality of jam nut covers, each cover removeably attached to a corresponding one of the plurality of jam nuts so that each jam nut cover conceals each jam nut regardless of the orientation of the jam nut.

9. The wheel liner assembly of claim 8, wherein the first axial extension and the second axial extension have a diameter smaller than a maximum diameter between parallel faces of the jam nut body.

10. The wheel liner assembly of claim 8, wherein the first and second axial extensions are of different lengths so that each jam nut can be reversed for either the first axial extension or the second axial extension to fill a different amount of space located between the wheel liner and the vehicle wheel.

11. The wheel liner assembly of claim 8, wherein the first axial extension has a length of 2 mm and the second axial extension has a length of 6 mm so that each jam nut can be reversed for the first axial extension or the second axial extension to occupy a different amount of space located between the wheel liner and the vehicle wheel.

12. The wheel liner assembly of claim 8, wherein the first axial extension has a length of 1 mm and the second axial extension has a length of 12 mm so that each jam nut can be reversed for the first axial extension or the second axial extension to occupy a different amount of space located between the wheel liner and the vehicle wheel.

* * * * *